(12) United States Patent
Fan Jiang et al.

(10) Patent No.: US 8,004,639 B2
(45) Date of Patent: Aug. 23, 2011

(54) LIQUID CRYSTAL DISPLAY PANEL

(75) Inventors: Shih-Chyuan Fan Jiang, Hsinchu (TW); Ching-Huan Lin, Hsinchu (TW); Chih-Ming Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 12/978,347

(22) Filed: Dec. 23, 2010

(65) Prior Publication Data

US 2011/0096283 A1 Apr. 28, 2011

Related U.S. Application Data

(62) Division of application No. 12/049,392, filed on Mar. 17, 2008, now Pat. No. 7,884,901.

(30) Foreign Application Priority Data

Aug. 14, 2007 (TW) ................ 96129969 A

(51) Int. Cl.
*G02F 1/1337* (2006.01)
*G02F 1/1339* (2006.01)
(52) U.S. Cl. ................. 349/129; 349/155

(58) Field of Classification Search ............ 349/129, 349/155–157
See application file for complete search history.

(56) References Cited

U.S. PATENT DOCUMENTS 6,788,375 B2 * 9/2004 Ogishima et al. ............ 349/130
* cited by examiner

*Primary Examiner* — David Nelms
*Assistant Examiner* — Michael Inadomi
(74) *Attorney, Agent, or Firm* — Jianq Chyun IP Office

(57) ABSTRACT

An LCD panel includes a first substrate, a second substrate, alignment protrusions and a liquid crystal layer between the first substrate and the second substrate. The first substrate includes pixel units arranged in an array. Each of the pixel units has at least one reflection area and one transmittance area. The first substrate has concaves in the reflection areas. The second substrate is above the first substrate. The first substrate or the second substrate has at least one padding layer in the reflection area. The alignment protrusions having approximately the same height are disposed on the second substrate and located in centers of each of the reflections and the transmittance areas. In the reflection area, a group of the alignment protrusions are in the concaves to keep a gap from the first substrate. The other group of the alignment protrusions outside of the concaves contact with the first substrate directly.

13 Claims, 8 Drawing Sheets

LIQUID CRYSTAL DISPLAY PANEL

CROSS-REFERENCE TO RELATED APPLICATION

This application is a divisional application of and claims the priority benefit of U.S. application Ser. No. 12/049,392, filed on Mar. 17, 2008, now allowed. The prior application Ser. No. 12/049,392 claims the priority benefit of Taiwan application serial no. 96129969, filed on Aug. 14, 2007. The entirety of each of the above-mentioned patent applications is hereby incorporated by reference herein and made a part of specification.

BACKGROUND OF THE INVENTION

1. Field of the Invention

The present invention relates to a liquid crystal display (LCD) panel and more particularly to an LCD panel having a plurality of alignment protrusions.

2. Description of Related Art

Nowadays, the performance requirements of the market for the LCDs are high contrast ratio, no gray scale inversion, little color shift, high luminance, high color vividness, high color saturation, quick response, wide-viewing angle and so forth. Currently, several types of display devices can meet the requirement for wide-viewing angle, such as the twisted nematic (TN) LCD along with a wide-viewing film, the in-plane switching (IPS) LCD, the fringe field switching LCD, and the multi-domain vertical alignment (MVA) LCD.

For example, as for the MVA LCD technique, it is mostly disposing alignment protrusions in the LCD panel and alignment slits on pixel electrodes to arrange the liquid crystal molecules in multi-domain so as to achieve the effect of wide-viewing angle. When the size of the LCD panel becomes gradually larger, the LCD panel is usually influenced by factors, such as the gravity, and thus, the cell gaps between the liquid crystal layers become uneasy to be maintained. Therefore, when fabricating large-size LCD panels, besides fabricating alignment protrusions to achieve the effect of the wide-viewing angle, it is further required to dispose spacers, such as photo spacers and ball spacers, to maintain proper cell gaps so as to further enhance the quality of the LCD panels.

However, respectively fabricating spacers and alignment protrusions in the LCD panels would increase fabricating steps and cost, which is not cost-effective. Therefore, how to save fabrication cost and provide good product quality at the same time remains an important issue in fabricating LCD panels, especially when it comes to fabricating large-size LCD panels.

SUMMARY OF THE INVENTION

The present invention is directed to a liquid crystal display (LCD) panel solving the problems of complicated fabrication steps and high fabrication cost caused by fabricating alignment protrusions and spacers by adopting different fabrication steps.

The present invention provides an LCD panel including a first substrate, a second substrate, a plurality of alignment protrusions and a liquid crystal layer located between the first substrate and the second substrate. The first substrate includes a plurality of pixel units arranged in an array. Each of the pixel units has at least one reflection area and one transmittance area. The first substrate has a plurality of concaves located in the reflection areas. The second substrate is located above the first substrate. The first substrate or the second substrate has at least one padding layer located in the reflection areas. The alignment protrusions are disposed on the second substrate, which are located in centers of each of the reflection areas and each of the transmittance areas, and a height of each of the alignment protrusions is approximately the same. In the reflection areas, a group of the alignment protrusions are located in the concaves so as to keep a gap from the first substrate. The other group of the alignment protrusions not located in the concaves contact with the first substrate directly.

In one embodiment of the present invention, each of the pixel units includes an active device, a reflective pixel electrode and a transparent pixel electrode. The reflective pixel electrodes are electrically connected with the active devices, for example, and located within the reflection areas. The transparent pixel electrodes are also electrically connected with the active devices and located within the transmittance areas. Furthermore, the active devices can further be located below the reflective pixel electrodes.

In one embodiment of the present invention, the pixel units further include a plurality of bumps, and the reflective pixel electrodes are located on the bumps. Moreover, the first substrate has the padding layers. The bumps and the reflective pixel electrodes are located on the padding layers.

In one embodiment of the present invention, the second substrate has the padding layers, and the alignment protrusions are located on the padding layers.

In one embodiment of the present invention, in the transmittance areas, a cell gap between the first substrate and the second substrate is approximately equal to the sum of a height of the padding layers and a height of the alignment protrusions.

In one embodiment of the present invention, in the reflective areas, the cell gap between the first substrate and second substrate is approximately equal to the height of the alignment protrusions.

In one embodiment of the present invention, the second substrate further includes a black matrix located above the alignment protrusions.

In one embodiment of the present invention, the second substrate further includes a common electrode. The alignment protrusions are located on the common electrode.

In one embodiment of the present invention, the first substrate further includes a plurality of scan lines and a plurality of data lines. Each of the scan lines and each of the data lines are electrically connected with pixel units corresponding thereto.

In one embodiment of the present invention, a material of the alignment protrusions may be consisted of an elastic material.

The present invention further provides an LCD panel including a first substrate, a second substrate, a plurality of alignment protrusions and a liquid crystal layer. The first substrate includes a plurality of pixel units arranged in an array. Each of the pixel units has a plurality of display areas. The first substrate has a plurality of concaves located in centers of a part of the display areas. The second substrate is located above the first substrate. The alignment protrusions are located on the second substrate and located in centers of the display areas. A height of the alignment protrusions is approximately the same. A group of the alignment protrusions are located in the concaves so as to keep a gap from the first substrate, and the other group of the alignment protrusions not located in the concaves contact with the first substrate directly. The liquid crystal layer is located between the first substrate and the second substrate.

In one embodiment of the present invention, each of the pixel units includes an active device, a planar layer and a plurality of electrode blocks. The planar layer covers the active device. The electrode blocks are located on the planar layer and electrically connected with the active device. In addition, each of the electrode blocks is located in each of the display areas.

In one embodiment of the present invention, the concaves are located in the planar layer.

In one embodiment of the present invention, the electrode blocks include a transparent electrode block and a reflective electrode block. The active device is located below the reflective electrode block.

In one embodiment of the present invention, the electrode blocks are transparent electrode blocks.

In one embodiment of the present invention, each of the pixel units further includes at least one connection electrode located between two adjacent electrode blocks.

In one embodiment of the present invention, a size of the concaves is approximately capable of accommodating one of the corresponding alignment protrusion.

In one embodiment of the present invention, a cell gap between the first substrate and second substrate is approximately equal to a height of the alignment protrusions.

In one embodiment of the present invention, an edge of the concave approximately surrounds one of the alignment protrusions. In the mean time, the cell gap between the first substrate and the second substrate is approximately equal to the sum of the height of the alignment protrusions and the depth of the concaves.

In one embodiment of the invention, the second substrate further includes a black matrix located above the alignment protrusions.

In one embodiment of the present invention, the second substrate further includes a common electrode, and the alignment protrusions are located on the common electrode.

In one embodiment of the present invention, the first substrate further includes a plurality of scan lines and a plurality of data lines. Each of the scan lines and each of the data lines are electrically connected with pixel units corresponding thereto.

In one embodiment of the present invention, a material of the alignment protrusions may be consisted of an elastic material.

In the LCD panel of the present invention, a group of the alignment protrusions located in centers of the electrode blocks contact with the first substrate directly so that the group of alignment protrusions can be used as spacers. Thus, fabrication steps of the LCD panel of the present invention are more simplified than those in the prior art, and the fabrication cost are lower. In addition, the LCD panel of the present invention needs no disposition of spacers, and therefore, keeps a good displaying aperture ratio.

In order to the make the aforementioned and other objects, features and advantages of the present invention more comprehensible, several embodiments accompanied with figures are described in detail below.

DESCRIPTION OF EMBODIMENTS

The First Embodiment

Figure 1A:
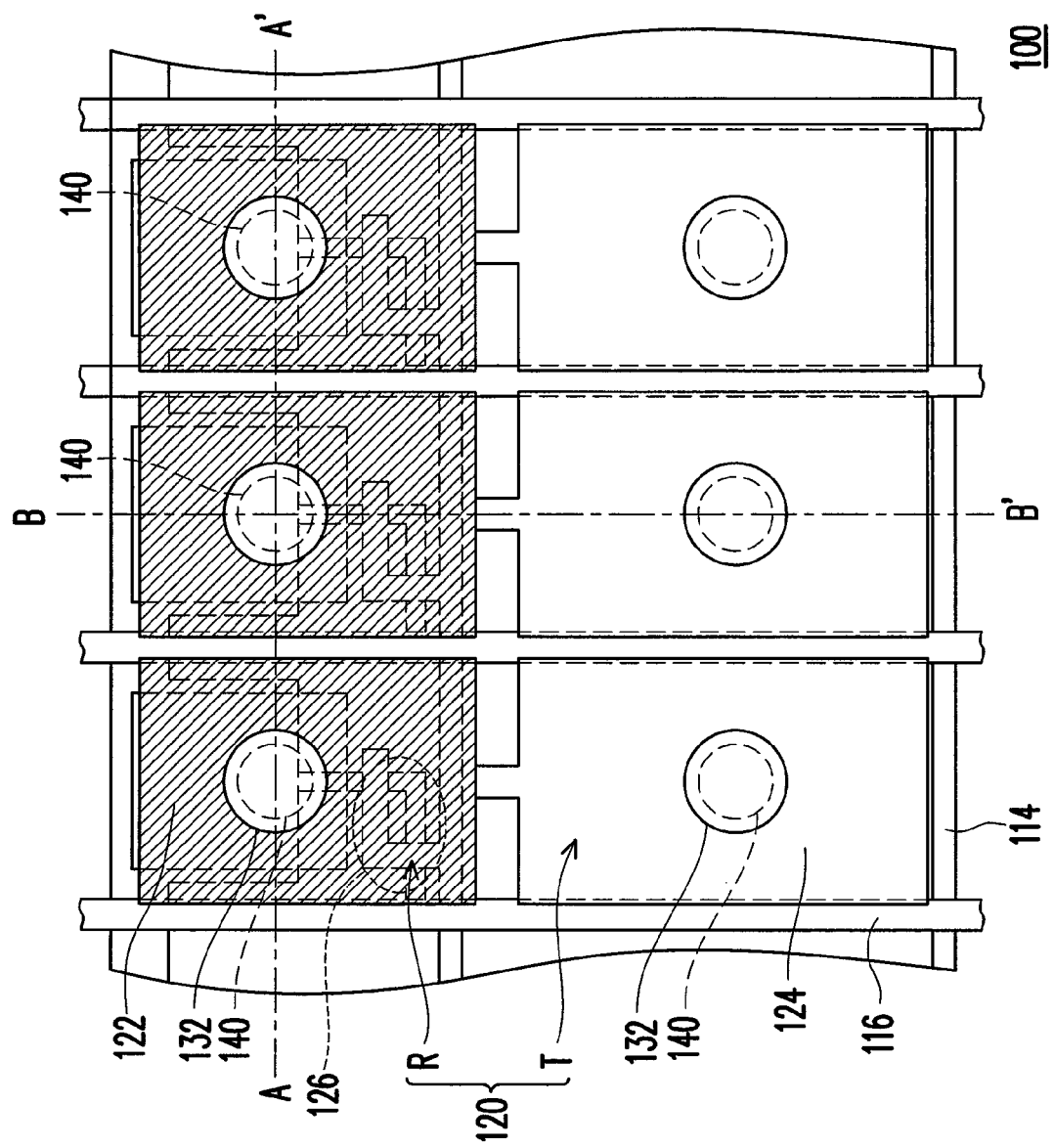
FIG. 1A is a schematic perspective view illustrating the LCD panel from a top viewing angle according to the first embodiment of the present invention.
Figure 1B:
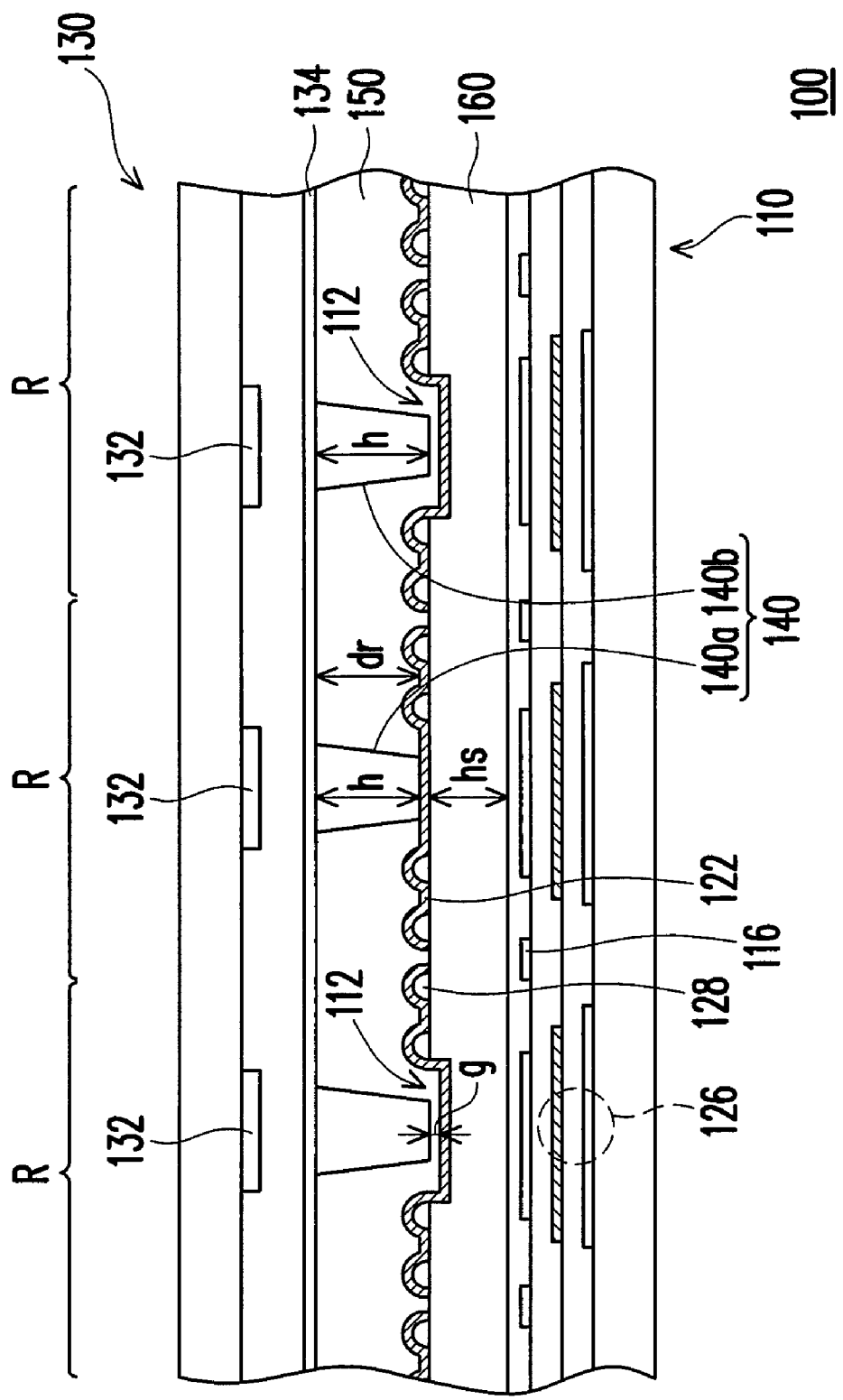
FIGS. 1B and 1C are cross-sectional views respectively illustrating an LCD panel along sectioning lines A-A' and B-B' of FIG. 1A.
Figure 1C:
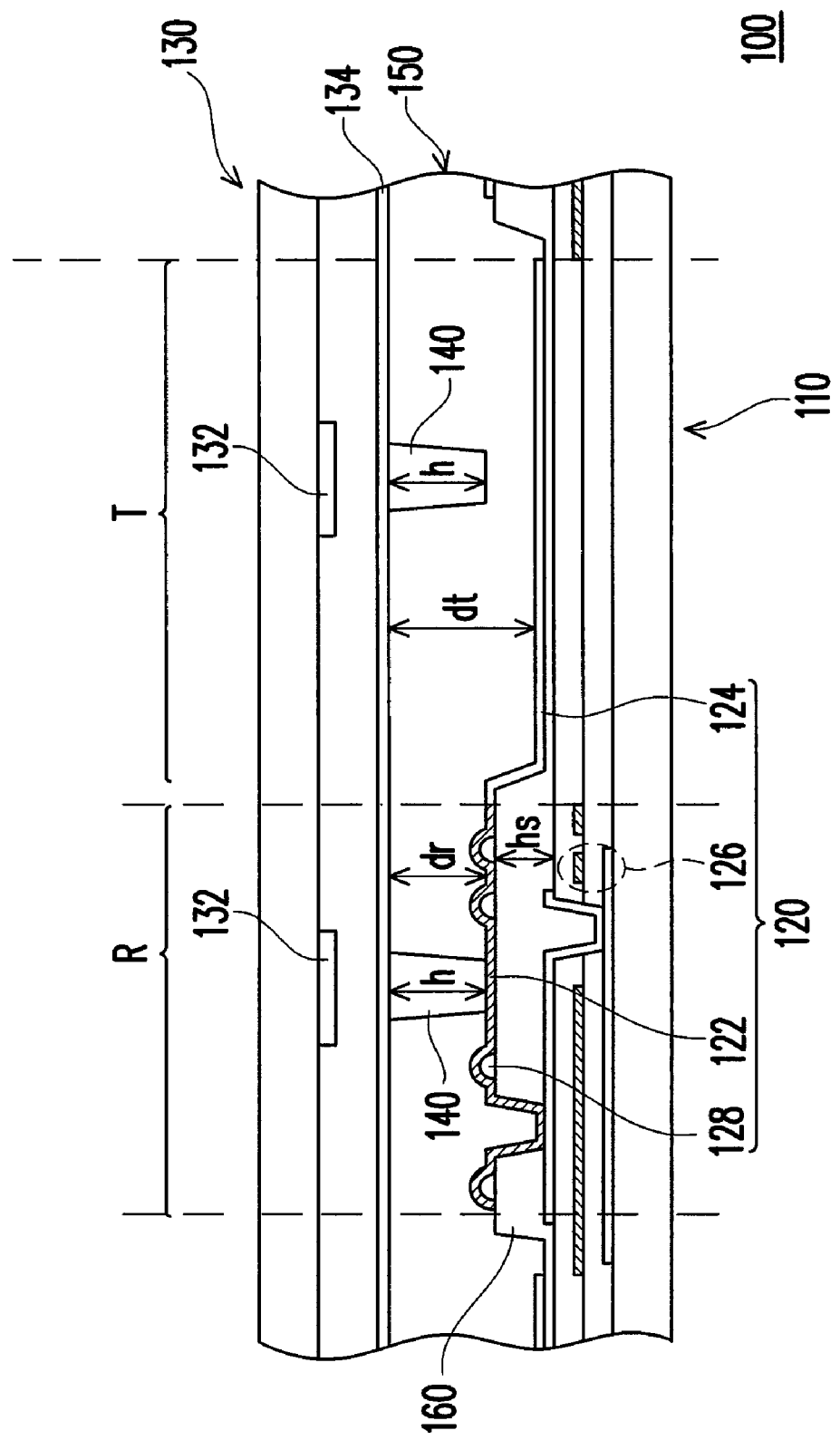
Figure 1D:
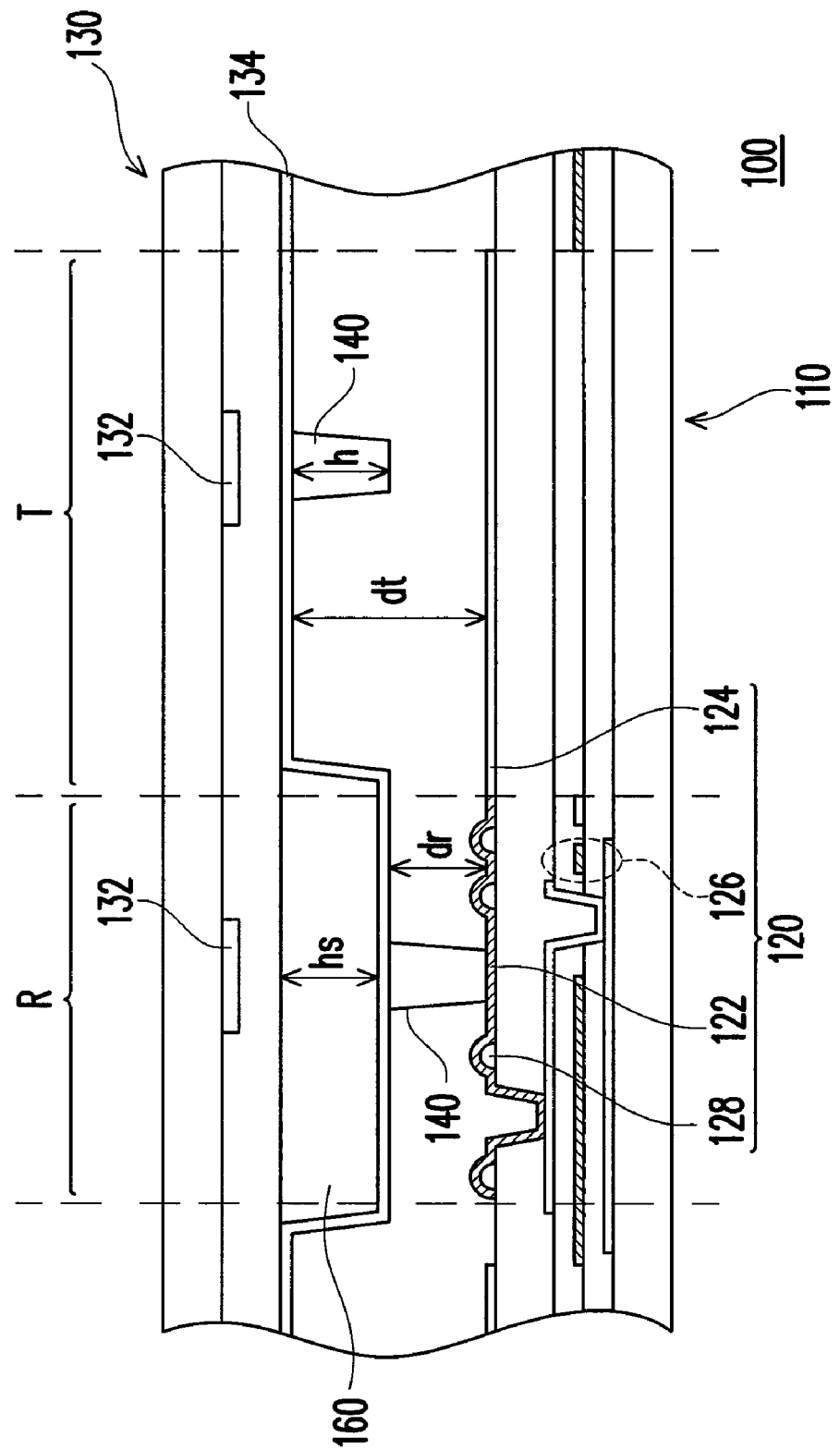
FIG. 1D is a cross-sectional view illustrating another LCD panel along the sectioning line B-B' of FIG. 1A.

FIG. 1A is a schematic perspective view illustrating the LCD panel from a top viewing angle according to the first embodiment of the present invention. FIGS. 1B and 1C are cross-sectional views respectively illustrating an LCD panel along sectioning lines A-A' and B-B' of FIG. 1A, and FIG. 1D is a cross-sectional view illustrating another LCD panel along the sectioning line B-B' of FIG. 1A. Referring to FIGS. 1A and 1B, an LCD panel 100 includes a first substrate 110, a second substrate 130, a plurality of alignment protrusions 140 and a liquid crystal layer 150 located between the first substrate 110 and the second substrate 130. The second substrate 130 is located above the first substrate 110. The first substrate 110 includes a plurality of pixel units 120 arranged in an array. Each of the pixel units 120 has at least one reflection area R and a transmittance area T. The alignment protrusions 140 are disposed on the second substrate 130 and located in centers of each of the reflection areas R and each of the transmittance areas T. Herein, the height h of each of the alignment protrusions 140 is approximately the same. The alignment protrusions 140 are disposed in the centers of both of each of the reflection areas R and each of the transmittance areas T so that liquid crystal molecules in the liquid crystal layer 150 are arranged in a multi-domain alignment so as to achieve an display effect of wide-viewing angle.

To allow the reflection areas R and the transmittance areas T of the LCD panel 100 to approximately have the same display effect, a padding layer 160 can be disposed in the reflection area R on the first substrate 110 or the second substrate 130. FIG. 1B illustrates an example in which the padding layer 160 is disposed on the first substrate 110. In practice, the first substrate 110 has a plurality of concaves 112 located in the reflection areas R. A group of alignment protrusions 140b are located in the concaves 112 so as to keep a gap g from the first substrate 110. In the reflection area R, the other group of alignment protrusions 140a not located therein contact with the first substrate 110 directly. A size of the concaves 112 is approximately capable of accommodating an alignment protrusion 140 or larger.

In detail, the concave 112 can be disposed in each layer of the first substrate 110. For example, after the padding layer 160 is disposed on the first substrate 110, the concaves 112 can be formed on the padding layer 160 so that a group of the alignment protrusions 140b in the reflection areas R do not directly contact with the first substrate 110. Certainly, when the padding layer 160 is disposed on the second substrate 130, the concaves 112 can be formed in other layers of the first substrate 110. In the present embodiment, the concaves 112 are fabricated in correspondence to the alignment protrusions 140, specifically the positions of the concaves are corresponding to the areas which the alignment protrusions 140 are not directly contacted the first substrate 110. In other words, with different design needs, the distribution densities and the positions of the concaves 112 on the first substrate 110 can be modulated so that the distribution of the alignment protrusions 140a directly contacting with the first substrate 110 can be in a specific distribution and in a specific density.

Referring to FIG. 1C, in a scenario where the padding layer 160 is disposed, a cell gap dt between the first substrate 110 and the second substrate 130 in the transmittance area T is different from a cell gap dr of that in the reflection area R. Since in the reflection area R, a group of the alignment protrusions 140 directly contact with the first substrate 110, the cell gap dr in the reflection area R of the LCD panel 100 is approximately equal to a height h of the alignment protrusions 140. In addition, the cell gap dt of the transmittance area T is approximately equal to the sum (hs+h) of a height hs of the padding layer 160 and the height h of the alignment protrusions 140. In other words, the group of the alignment protrusions 140 disposed on the second substrate 130 can be used for maintaining the cell gaps dt and dr between the first substrate 110 and the second substrate 130. In addition, an elastic material can be selected for fabricating the alignment protrusions 140 in the present embodiment so as to extend the lifespan of the alignment protrusions 140.

Furthermore, a method for fabricating the alignment protrusions 140 is, for example, forming a photoresist material layer on the second substrate 130 and patterning the photoresist material layer so as to form the alignment protrusions 140 located in the centers of the reflection areas R and the transmittance areas T. Each of the alignment protrusions 140 is generated at the same fabrication step, which thus, has approximately the same height. Moreover, the LCD panel of the present embodiment can maintain the cell gaps dt and dr in a proper way by utilizing the alignment protrusions 140 with the concaves 112 while the additional disposition of spacers, such as ball spacers are not needed. Therefore, a step for fabricating spacers can be omitted from the process for fabricating the LCD panel 100 so that the fabrication cost can be reduced. A display aperture ratio of the LCD panel 100 would not be restricted by simultaneously disposing the alignment protrusions 140 and the spacers.

Referring to both FIGS. 1A and 1C, in the present embodiment, each of the pixel units 120 includes a reflective pixel electrode 122, a transparent pixel electrode 124 and an active device 126. Both the reflective pixel electrode 122 and the transparent pixel electrode 124 are electrically connected with the active device 126. In addition, the first substrate 110 further includes a plurality of scan lines 114 and a plurality of data lines 116. Each of the scan lines 114 and each of the data lines 116 are electrically connected with the pixel unit 120 corresponding thereto. To enhance the display aperture ratio of the LCD panel 100, the active device 126 can be located below the reflective pixel electrode 122. The reflection area R in the pixel unit 120 is referred to the area having the reflective pixel electrode 122 located therein, while the transmittance area T is referred to the area having the transparent pixel electrode 124 located therein. In brief, the LCD panel 100 is a transflective LCD panel.

In addition, the pixel unit 120 can further include a plurality of bumps 128, and the reflective pixel electrode 122 can be disposed on the bump 128 so as to enhance the reflectivity of the reflective pixel electrode 122. In FIG. 1C, the padding layer 160 is disposed on the first substrate 110, and thus, the bump 128 and the reflective pixel electrode 122 are disposed on the padding layer 160. Certainly, under different designs, as shown in FIG. 1D, the padding layer 160 can also be disposed on the second substrate 130. In the meantime, the alignment protrusion 140 can be disposed on the padding layer 160.

The second substrate 130 can further include a black matrix 132 located above the alignment protrusion 140 so as to shield the light leakage caused by disclination of liquid crystal molecules surrounding the alignment protrusion 140. Furthermore, the second substrate 130 further includes a common electrode 134, and the alignment protrusions 140 are disposed on the common electrode 134. To achieve a display effect of colorfulness, a color filter layer can be further disposed on the second substrate 130 or the first substrate 110. The color filter layer can be consisted of a red, a blue and a green color filter films. In the meantime, the group of the alignment protrusions 140 directly contacting with the first substrate 110 can, for example, be disposed corresponding to the blue color filter film so that the LCD panel 100 has better light transmittance.

The Second Embodiment

Figure 2A:
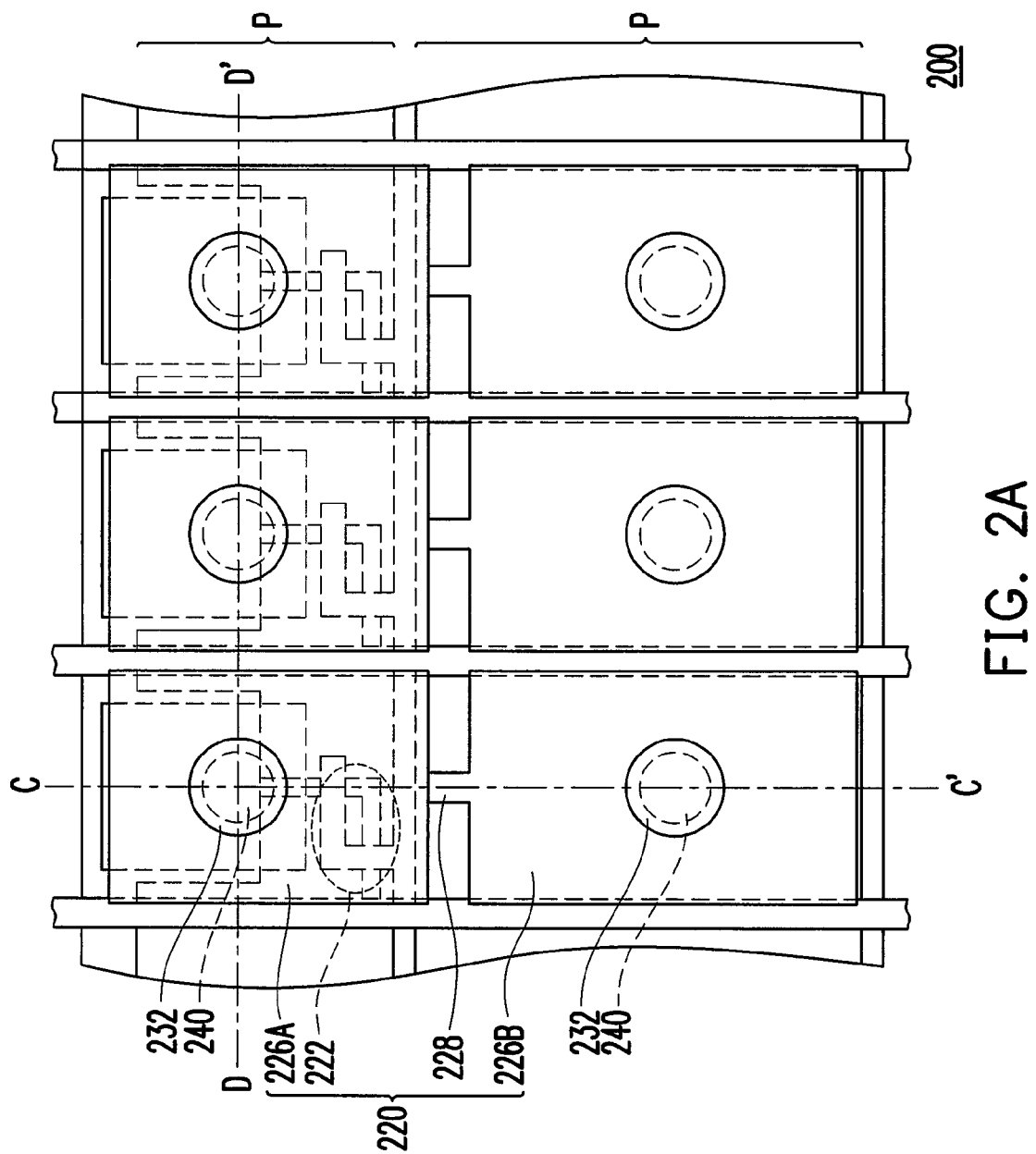
FIG. 2A is a schematic top view illustrating the LCD panel according to the second embodiment of the present invention.
Figure 2B:
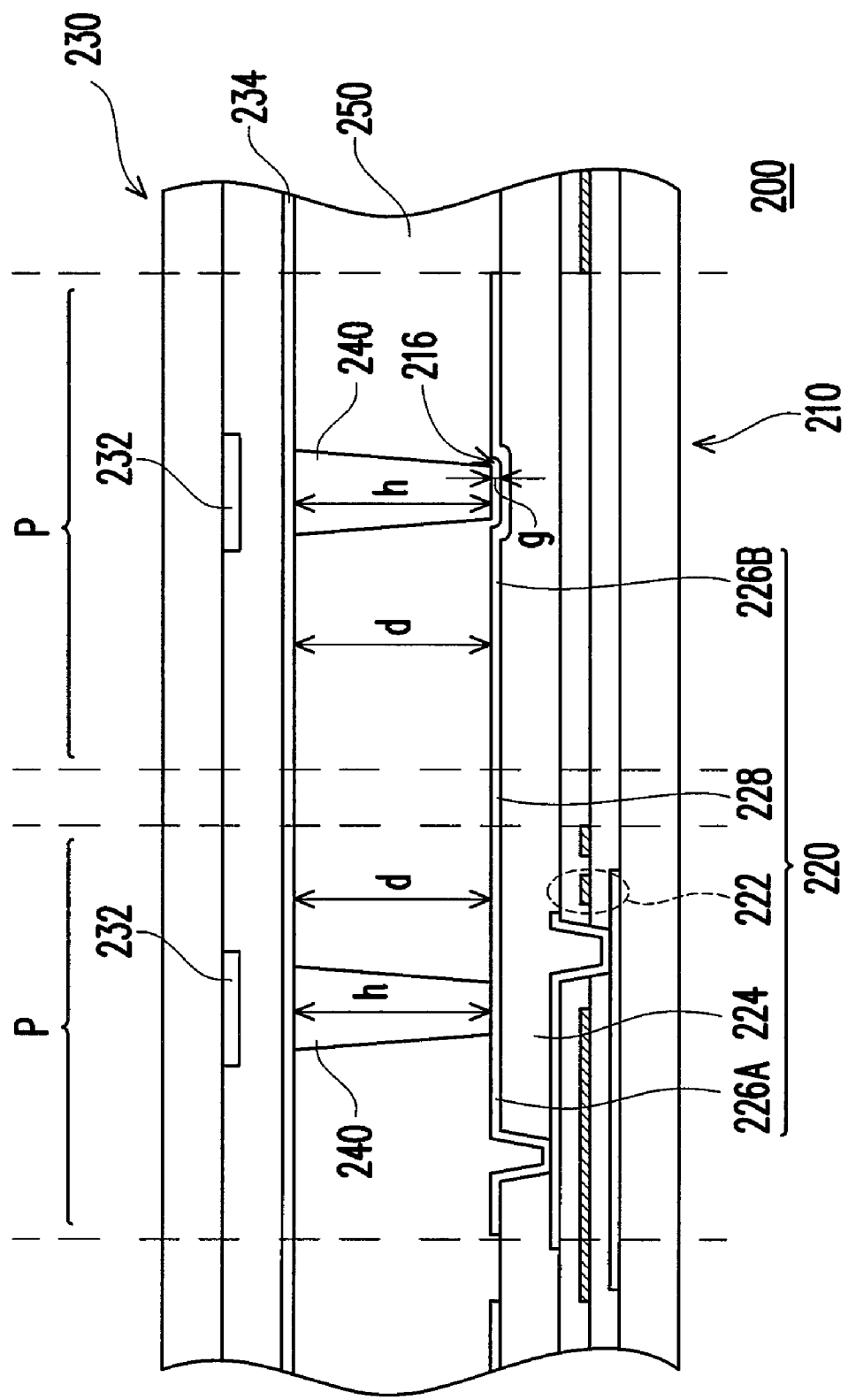
FIG. 2B is a cross-sectional view illustrating an LCD panel along a sectioning line C-C' of FIG. 2A.
Figure 2C:
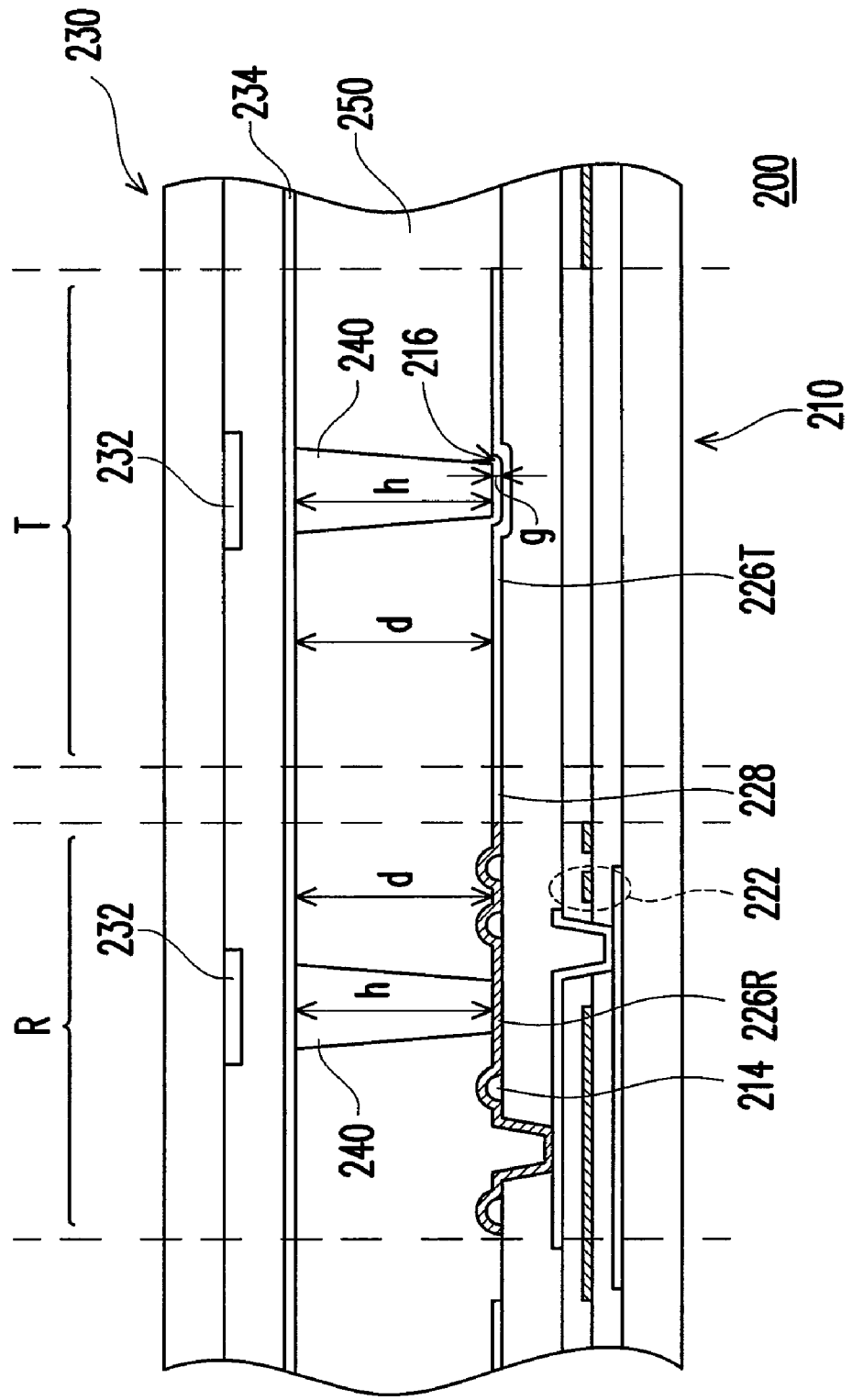
FIG. 2C is a cross-sectional view illustrating another LCD panel along the sectioning line C-C' of FIG. 2A.

FIG. 2A shows a schematic top view illustrating an LCD panel according to the second embodiment of the present invention. FIGS. 2B and 2C are schematic cross-sectional views illustrating two types of LCD panels along a sectioning line C-C' of FIG. 2A. First, referring to FIGS. 2A and 2B, an LCD panel 200 includes a first substrate 210, a second substrate 230, a plurality of alignment protrusions 240 and a liquid crystal layer 250. The liquid crystal layer 250 is located between the first substrate 210 and the second substrate 230. The first substrate 210 includes a plurality of pixel units 220 arranged in an array. Each of the pixel units 220 has a plurality of display areas P. The second substrate 230 is located above the first substrate 210. The alignment protrusions 240 are located on the second substrate 230 and located in centers of each of the display areas P. A height h of each of the alignment protrusions 240 is approximately the same. The first substrate 210 further includes a plurality of scan lines 212 and a plurality of data lines 214. Each of the scan lines 212 and each of the data lines 214 are electrically connected with the pixel unit 220 corresponding thereto.

In addition, the first substrate 210 has a plurality of concaves 216 located in centers of a part of the display areas P. In FIGS. 2B and 2C, a size of the concave 216 is capable of accommodating an alignment protrusion 240, for example. A group of the alignment protrusions 240 are located in the concaves 216 so as to keep a gap g from the first substrate 210. The other group of the alignment protrusions 240 not located in the concaves 216 contact with the first substrate 210 directly. Thus, the alignment protrusions 240 not located in the concaves 216 can be used for maintaining a cell gap d of the LCD panel 200. That is, the cell gap d between the first substrate 210 and the second substrate 230 is approximately equal to the height h of the alignment protrusions 240. Specifically, the LCD panel 200 can maintain the proper cell gap d without deploying spacers, and thus, the LCD panel 200 has advantages of low fabrication cost and high display aperture ratio.

Each of the pixel units 220 includes an active device 222, a planar layer 224 and a plurality of electrode blocks 226A and 226B. The planar layer 224 covers the active device 222. The electrode blocks 226 are located on the planar layer 224 and electrically connected with the active device 222. In addition, each of the electrode blocks 226A and 226B is located in a center of each of the display areas P. The concaves 216 are located in the planar layer 224. In the present embodiment, the electrode blocks 226A and 226B are transparent electrode blocks, that is, the electrode block 226A and the electrode block 226B are consisted of a transparent conductive material. For example, the transparent conductive material used in the present embodiment can be indium-tin-oxide (ITO) or indium-zinc-oxide (IZO). Meanwhile, each of the pixel units 220 further includes at least one connection electrode 228 located between the adjacent electrode blocks 226A and 226B.

Furthermore, referring to FIG. 2C, the electrode blocks can also be consisted of a transparent electrode block 226T and a reflective electrode block 226R so that the LCD panel 200 can be a transflective LCD panel. In the meantime, the active device 222 can be located below the reflective electrode block 226R. To enhance a reflectivity of the reflective electrode block 226R, a plurality of bumps 214 can be disposed below the reflective electrode block 226R on the first substrate 210. It should be noted that in FIG. 2C, the cell gap d between the first substrate 210 and the second substrate 230 is maintained as constant, that is, the LCD panel 200 is a single-gap transflective LCD panel.

Figure 2D:
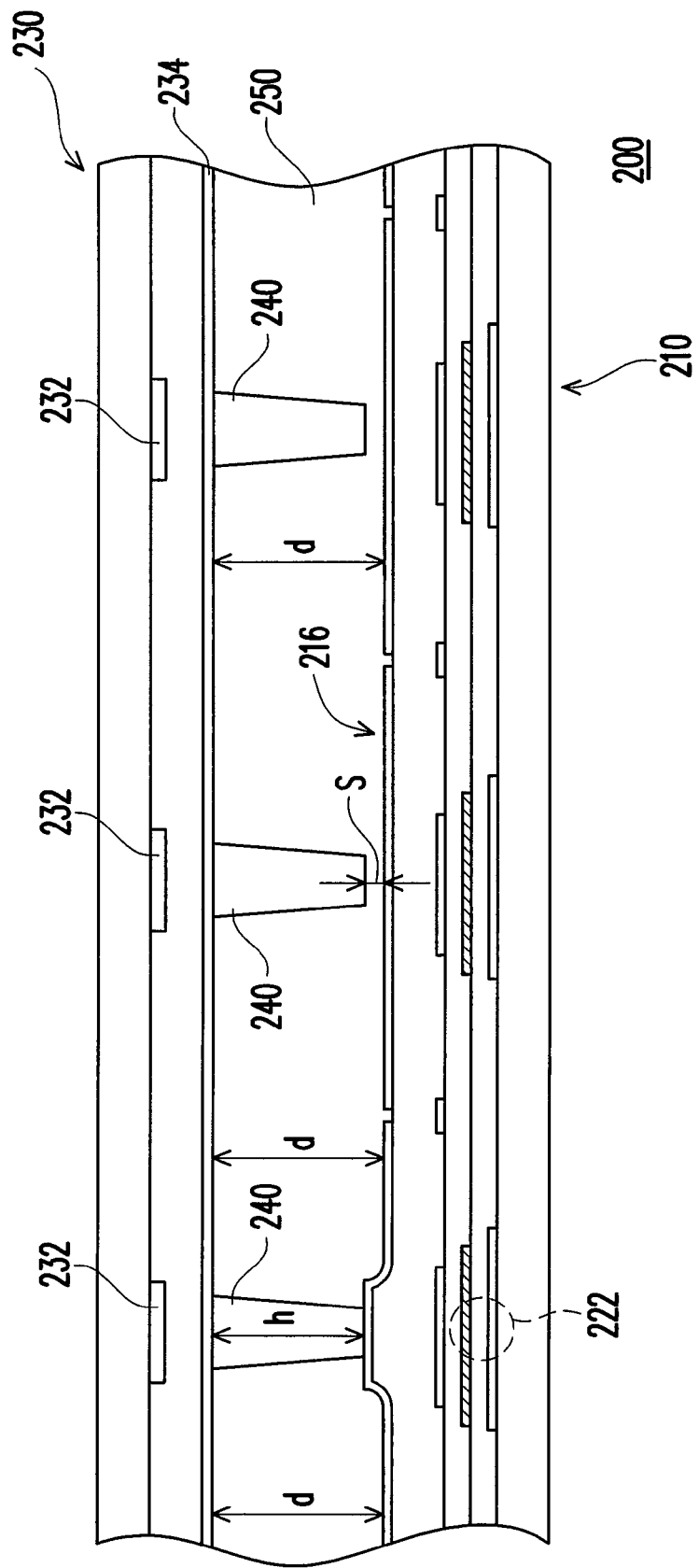
FIG. 2D is a cross-sectional view illustrating an LCD panel along a sectioning line D-D' of FIG. 2A.

FIG. 2D is a cross-sectional view illustrating an LCD panel along a sectioning line D-D' of FIG. 2A. Referring to FIG. 2D, a size of the concave 216 can also accommodate a plurality of alignment protrusions 240, and even allow the edge of the concave 216 to approximately surround an alignment protrusion 240. That is, a relatively higher portion of the side which the liquid crystal layer 250 contacts with the first substrate 210 corresponds to the position of the alignment protrusion 240. Each of the relatively higher portions is approximately capable of accommodating an alignment protrusion 240. In the mean time, the cell gap d between the first substrate 210 and the second substrate 230 is approximately equal to the sum (h+s) of the height h of the alignment protrusion 240 and the depth s of the concave 216. In other words, the relatively higher portions in stead of the concaves 216 on the first substrate 210 contact with a group of the alignment protrusions 240 directly so as to maintain the cell gap d of the LCD panel 200. Herein, the alignment protrusions 240 have the feature of maintaining the cell gap d, and thus, the alignment protrusions 240 can be consisted of an elastic material.

In addition, in the LCD panel 200 of the present embodiment, the second substrate 230 further includes a black matrix 232 located above the alignment protrusions 240. The second substrate 230 further includes a common electrode 234, and the alignment protrusions 240 are disposed on the common electrode 230. A color filter layer consisted of a red, a blue and a green color filter films can be further disposed on the second substrate 230. The group of the alignment protrusions 240 used for maintaining the cell gap d are disposed corresponding to the blue color filter film so that the LCD panel 200 has better light transmittance.

Based on the above, in the LCD panel of the present invention, the cell gap is properly maintained by way of utilizing the alignment protrusions with the concaves to allow a group of the alignment protrusions to contact with the first substrate. Thus, the LCD panel of the present invention does not require additionally dispose spacers so that the fabrication cost is reduced and the fabrication process is simplified. Furthermore, the display aperture ratio of the LCD panel of the present invention would not be influenced by the additionally disposed spacers. Accordingly, the LCD panel of the present invention has better display aperture ratio. In general view of the forgoing, the LCD panel of the present invention has advantages of low fabrication cost, simplified fabrication steps and good quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) panel, comprising:
a first substrate including a plurality of pixel units arranged in an array, wherein each of the pixel units has at least one transmittance area, and the first substrate has a plurality of concaves having a size located in the transmittance areas;
a second substrate located above the first substrate;
a plurality of alignment protrusions disposed on the second substrate and located in the center of each of the transmittance areas, respectively, a height of each of the alignment protrusions being approximately the same, the size of one concave being approximately capable of accommodating one of the alignment protrusions, wherein in the transmittance areas, a group of the alignment protrusions are located in the concaves so as to keep a gap from the first substrate, and another group of the alignment protrusions located outside of the concaves contact with the first substrate directly; and
a liquid crystal layer located between the first substrate and the second substrate.

2. The LCD panel of claim 1, wherein each of the pixel units comprises:
an active device; and
at least one transparent pixel electrode electrically connected with the active device and located within the transmittance area.

3. The LCD panel of claim 2, wherein the active device is located below the transparent pixel electrode.

4. The LCD panel of claim 2, wherein the first substrate further comprises a plurality of scan lines and a plurality of data lines, and each of the scan lines and each of the data lines are electrically connected with the pixel unit corresponding thereto.

5. The LCD panel of claim 1, wherein in the transmittance areas, a cell gap between the first substrate and the second substrate is approximately equal to a height of the alignment protrusions.

6. The LCD panel of claim 1, wherein the second substrate further comprises a black matrix, located above the alignment protrusions.

7. The LCD panel of claim 1, wherein the second substrate further comprises a common electrode, and the alignment protrusions are disposed on the common electrode.

8. The LCD panel of claim 1, wherein a material of the alignment protrusions includes an elastic material.

9. The LCD panel of claim 1, wherein the transparent pixel electrode includes a plurality of transparent electrode blocks.

10. The LCD panel of claim 9, wherein each of the pixel units further comprises at least one connection electrode located between two adjacent transparent electrode blocks.

11. The LCD panel of claim 1, wherein an edge of the concave approximately surrounds one of the alignment protrusions.

12. The LCD panel of claim 1, wherein each of the pixel units comprises:
an active device;
a planar layer covering the active device; and
at least one transparent pixel electrode disposed on the planar layer and located within the transmittance area, and electrically connected with the active device.

13. The LCD panel of claim 12, wherein the concaves are located in the planar layer.

* * * * *